F. F. SNYDER.
BELT SPLICE.
APPLICATION FILED APR. 10, 1922.

1,428,917.

Patented Sept. 12, 1922.

INVENTOR.
Frank F. Snyder,
BY
Robert D. Pearson,
ATTORNEY.

Patented Sept. 12, 1922.

1,428,917

UNITED STATES PATENT OFFICE.

FRANK F. SNYDER, OF TORRANCE, CALIFORNIA.

BELT SPLICE.

Application filed April 10, 1922. Serial No. 550,980.

*To all whom it may concern:*

Be it known that I, FRANK F. SNYDER, a citizen of the United States, residing at Torrance, in the county of Los Angeles and State of California, have invented certain new and useful Improvements in a Belt Splice, of which the following is a specification.

My invention relates to improvements in a double ply belt-splice for power transmission machinery, and the objects of my improvements are, first, to provide an unbroken running surface in power transmission belts of any material, to obtain a smooth and endless traction surface on pulleys or other flat surfaces; second, to provide a splice that will make a permanent and strong joint, by a simple plate and rivet means; third, in a splice that may be applied through the belt that will furnish the maximum of power transmission without breaking or tearing the holes or slits therein; fourth, to provide a splice that will conform to the curve of a pulley to increase the traction area of the belt thereon.

A further object of my invention is to provide a belt-splice that will conform to all the requirements of safety rules and regulations.

A still further object of my invention is to provide a belt-splice that will give an equal tension on all parts of the joint, to eliminate tearing, or ultimate wasting of the belt.

A still further object of my invention is to provide a belt-splice that may be used with a low cost, simple to install, and inexpensive to maintain.

I attain these objects by the joint illustrated in the accompanying drawing, in which—

Figure 1:
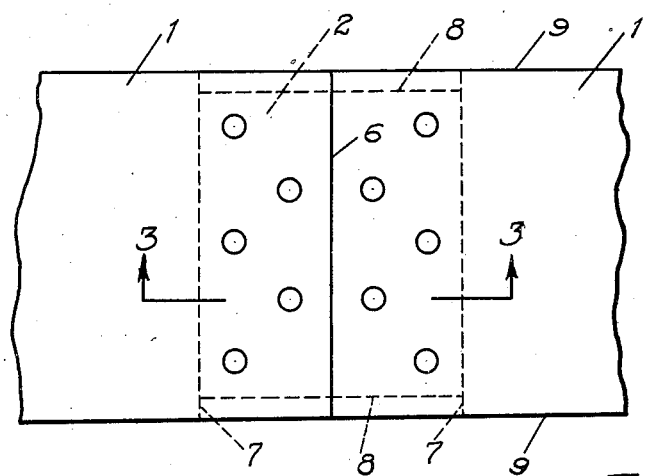
Figure 2:
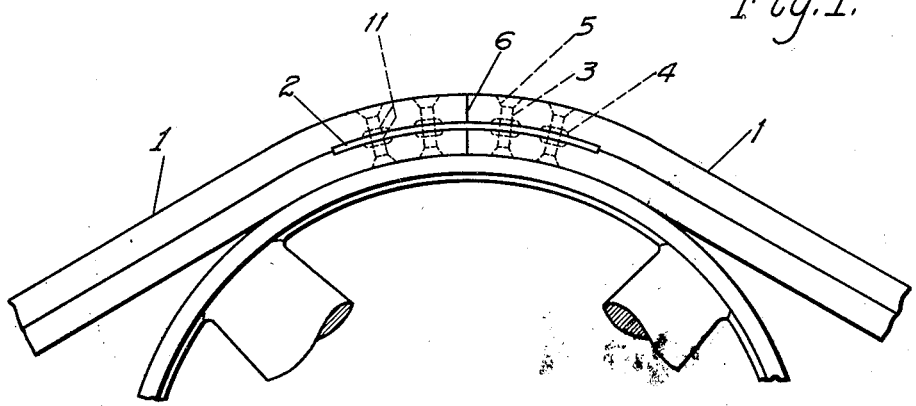
Figure 3:
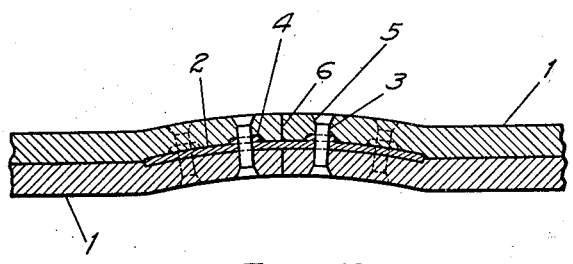

Figure 1 represents a plan view of the belt-splice; Fig. 2, a side view of the belt-splice; Fig. 3, a sectional view on line 3—3 of Fig. 1; and Fig. 4 a pin before riveting.

Similar numerals refer to similar parts throughout the several views.

The two ends of the double ply belt 1 are positioned squarely together at the joint 6, the slits 7 are cut in the central-end portions of the belt 1, between the plies thereof, from the joint 6 and extending back a sufficient distance to receive a plate 2, the said plate 2 is positioned in two slits 7 with an equal depth from the said joint 6, with the sides 8 on the plate 2 standing back of the sides 9 on the belt 1. The shoulders 4 are integral with one or both sides of the plate 2, the holes 11 pass through the said shoulders 4 in the said plate 2, and the pins 3 are in turn positioned through the belt 1, the heads 5 are integral with the said pins 3 and are positioned on the two ends thereof, flush with the outside faces of the belt 1.

The plate 2 is made rigid and is curved to conform to the shape of the face of the pulley over which the belt 1 runs.

Figure 4:
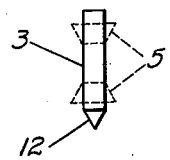

The points 12 are formed on one end of the pins 3, as shown in Figure 4, before riveting over the heads 5 to locate and drive the pins 3 through the holes 11.

To splice a belt with a plate 2 and pins 3, the two ends of the belt 1 form the joint 6 which is cut perfectly square, the slits 7 are then cut into the two ends of the belt 1, to accommodate one half of the plate 2 in each of the said ends. The shoulders 4 are formed on the plate 2 in number and location to suit the requirements, with the holes 11 passing through the center thereof, to receive and reinforce the said pins 3. The two ends of the belt 1 are punched with holes 11 to correspond with the number and location of the holes 11 in the plate 2, the plate 2 may then be placed into position in the slits 7, with the shoulders 4 passing into the holes 11 in the said belt 1, the points 12 of the pins 3 are then forced through the said holes 11 in the belt 1, and through the holes 11 in the shoulders 4, and the entire assembly is then pressed into a solid joint, by riveting the ends of the pins 3 back into the belt 1 to form the heads 5, flush with the outer faces thereof, to make an even and unbroken running surface on all four sides of the said belt-splice, and a continuous traction surface, with no clearance requirements other than the actual thickness or width of the said belt 1.

The belt 1 with the curved plate 2 therein is then run over the pulleys, as shown in Figure 2, and in a straight line, as shown in Figure 3, without bending and the shoulders 4 prevent creeping of the belt 1 and shearing of the pins 3, and after continuous running on the pulleys in tension, the belt 1, shoulders 4 and heads 5, will press and wear into a solid unbreakable joint.

A belt with my improved belt-splice can be shifted from one pulley to the other with no danger to the operator due to surplus material extending beyond the thickness or width of the belt, and will run practically endless with no pounding or vibration whatsoever, particularly over small pulleys.

Having thus described my invention what I claim is:

1. In a belt of the class described, a belt-splice with two ends joined together, in combination with a curved plate spliced between the two ends of the said belt, pins positioned through the said two fitted ends of the belt and the plate, riveted heads integral with both outer ends of the said pins flush with the outer surface of the belt, shoulders positioned on the said plate and extending into the said belt-splice adapted to receive the said pins, as set forth.

2. In a double ply belt of the class described, a belt-splice with two fitted ends joined together, in combination with a curved plate positioned between the plies of the said splice, shoulders positioned in the said curved plates, pins positioned through the ends of the said belt and the said shoulders, riveted heads integral with the two outer ends of the said pins, adapted to lie flush with the outer surface of the belt, as set forth.

In testimony whereof I affix my signature.

FRANK F. SNYDER.